(12) United States Patent
Roeland et al.

(10) Patent No.: US 9,872,321 B2
(45) Date of Patent: Jan. 16, 2018

(54) METHOD AND APPARATUS FOR ESTABLISHING AND USING PDN CONNECTIONS

(71) Applicant: TELEFONAKTIEBOLAGET L M ERICSSON (PUBL), Stockholm (SE)

(72) Inventors: Dinand Roeland, Sollentuna (SE); Zu Qiang, Kirkland (CA); Stefan Rommer, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/434,256

(22) PCT Filed: Oct. 9, 2013

(86) PCT No.: PCT/EP2013/071056
§ 371 (c)(1),
(2) Date: Apr. 8, 2015

(87) PCT Pub. No.: WO2014/056983
PCT Pub. Date: Apr. 17, 2014

(65) Prior Publication Data
US 2015/0296548 A1 Oct. 15, 2015

Related U.S. Application Data

(60) Provisional application No. 61/711,409, filed on Oct. 9, 2012, provisional application No. 61/721,656, filed on Nov. 2, 2012.

(51) Int. Cl.
H04W 76/02 (2009.01)
H04L 12/46 (2006.01)
(Continued)

(52) U.S. Cl.
CPC ........ *H04W 76/022* (2013.01); *H04L 12/4633* (2013.01); *H04L 12/4641* (2013.01);
(Continued)

(58) Field of Classification Search
CPC ............. H04L 12/4633; H04L 12/4641; H04L 29/12839; H04L 61/6022; H04L 61/01;
(Continued)

(56) References Cited

U.S. PATENT DOCUMENTS 6,654,792 B1   11/2003  Verma et al.
7,810,149 B2 *  10/2010  Islam ...................... H04L 45/52
                                            713/150
(Continued)

FOREIGN PATENT DOCUMENTS

CN      102316521      *    1/2012
WO    2006/118489 A1       11/2006

OTHER PUBLICATIONS

Wang, "Data transmission method, system and equipment", CN, English machine translation of CN102316521.*
(Continued)

*Primary Examiner* — Paul H Masur
*Assistant Examiner* — Michael Phillips
(74) *Attorney, Agent, or Firm* — Rothwell, Figg, Ernst & Manbeck, P.C.

(57) ABSTRACT

Establishing and controlling a tunnel for carrying a PDN connection between a first node and a second node. The first node sends a request to set up a tunnel, the request including a first identifier. The first node then receives a second identifier for use in identifying the tunnel when receiving data sent from the second node to the first node. Data packets are sent from the first node, the data packets including the first and/or second identifiers for identifying the tunnel from the first node to the second node. Data packets are received
(Continued)

from the second node, the data packets including the second identifier from the second node to the first node.

26 Claims, 5 Drawing Sheets

(51) Int. Cl.
*H04W 36/00* (2009.01)
*H04W 76/06* (2009.01)

(52) U.S. Cl.
CPC ..... *H04W 36/0022* (2013.01); *H04W 76/021* (2013.01); *H04W 76/062* (2013.01)

(58) Field of Classification Search
CPC .......... H04L 2212/00; H04W 36/0022; H04W 76/022; H04W 76/062; H04W 76/021; H04W 76/00; H04W 88/16; H04W 84/12; H04W 88/06; H04W 76/02; H04W 36/14; H04W 88/10; H04W 8/26; H04W 82/02; H04W 76/041
See application file for complete search history.

(56) References Cited

U.S. PATENT DOCUMENTS

| | | | | |
|---|---|---|---|---|
| 2004/0221042 A1* | 11/2004 | Meier | ................. | H04L 12/4625 709/227 |
| 2007/0174436 A1* | 7/2007 | Maekawa | ........... | H04L 12/4633 709/223 |
| 2007/0195804 A1* | 8/2007 | Ijima | ................... | H04L 12/2856 370/401 |
| 2008/0304456 A1* | 12/2008 | Iino | ..................... | H04L 12/2856 370/338 |
| 2009/0080418 A1* | 3/2009 | Koide | ................. | H04L 12/4633 370/389 |
| 2010/0067503 A1* | 3/2010 | Premec | ................... | H04L 45/50 370/338 |
| 2010/0157963 A1* | 6/2010 | Choi | ................... | H04L 12/4633 370/338 |
| 2011/0216743 A1* | 9/2011 | Bachmann | ............ | H04L 63/164 370/331 |
| 2012/0069763 A1* | 3/2012 | Zhao | ..................... | H04W 28/24 370/252 |
| 2012/0140719 A1* | 6/2012 | Hui | ..................... | H04W 76/021 370/329 |
| 2012/0182929 A1* | 7/2012 | Chen | ................... | H04L 63/1458 370/315 |
| 2012/0275401 A1* | 11/2012 | Sun | ........................ | H04W 72/04 370/329 |
| 2012/0294236 A1* | 11/2012 | Watfa | .................... | H04W 60/04 370/328 |
| 2014/0078968 A1* | 3/2014 | Korhonen | ......... | H04W 52/0229 370/328 |
| 2014/0078986 A1* | 3/2014 | Kaippallimalil | ...... | H04W 76/02 370/329 |
| 2014/0086226 A1* | 3/2014 | Zhao | ................... | H04W 76/022 370/338 |
| 2014/0133456 A1* | 5/2014 | Donepudi | ............. | H04W 88/10 370/331 |
| 2014/0321328 A1* | 10/2014 | Zuniga | .................... | H04W 8/06 370/254 |

OTHER PUBLICATIONS

International Search Report and Written Opinion issued in corresponding application No. PCT/EP2013/071056, dated Dec. 12, 2013, 9 pages.
"3rd Generation Partnership Project; Technical Specification Group Services and System Aspects;Study on S2a Mobility based On GTP & WLAN access to EPC (SaMOG); Stage 2 (Release 12)," 3GPP, 3GPP TR 23.852, v1.2.0 Red-line Version, Jul. 2012, 63 pages.
"3rd Generation Partnership Project; Technical Specification Group Services and System Aspects;Study on S2a Mobility based On GTP & WLAN access to EPC (SaMOG); Stage 2 (Release 12)," 3GPP, 3GPP TR 23.852, v1.2.0 Clean Version, Jul. 2012, 63 pages.
"3rd Generation Partnership Project; Technical Specification Group Services and System Aspects; Architecture enhancements for non-3GPP accesses (Release 11)," 3GPP, 3GPP TS 23.402, v.11.1.0, Dec. 2011, 232 pages.

* cited by examiner

METHOD AND APPARATUS FOR ESTABLISHING AND USING PDN CONNECTIONS

CROSS REFERENCE TO RELATED APPLICATION(S)

This application is a 35 U.S.C. §371 National Phase Entry Application from PCT/EP2013/071056 filed Oct. 9, 2013, which claims priority to U.S. Provisional Application No. 61/711,409, filed Oct. 9, 2012 and U.S. Provisional Application No. 61/721,656 filed, Nov. 2, 2012. The above identified applications are incorporated by reference in their entirety.

TECHNICAL FIELD

The present application relates generally to establishing and using Packet Data Network (PDN) connections.

BACKGROUND

The Third Generation Project Partnership (3GPP) has developed the System Architecture Evolution (SAE) as the core network architecture of its future and Long Term Evolution (LTE) wireless mobile telecommunications standard. The main component of the SAE architecture is the Evolved Packet Core (EPC); see "Architecture enhancements for non-3GPP Accesses," 3GPP TS 23.402). The LTE/SAE network includes network entities supporting the user and control planes.

An ongoing trend within telecommunications is the convergence of fixed and mobile networks, which is known as Fixed Mobile Convergence (FMC). The trend of evolving networks using IP-based technologies is common for fixed and mobile networks, which makes the convergence easier. By utilizing FMC, mobile and fixed network operators will be able to utilize their network resource more efficiently, which leads to a reduction of capital and operational expenditure (CAPEX and OPEX). For instance, when a user is running an IP-based application such as Multimedia Telephony (MMTel) inside their home, it is more efficient to utilize broadband connectivity of a fixed access network rather than a wireless access network.

Residential networks have been important to the success of FMC because they are the most commonly used fixed network access by ordinary users. Therefore, it is important to be able to connect mobile phones to the EPC through a residential network. The term User Equipment (UE) can be used in place of the term mobile terminal or mobile phone. The term UE is familiar in the 3GPP documentation, and is intended to refer to any piece of equipment that is configured to access the internet; it would include, for example and without limitation, mobile telecommunication devices, portable or handheld computing devices and desktop or installed computers.

3GPP defines mobile 2G/3G/LTE accesses and "non-3GPP accesses" (TS 23.402), wherein the latter can be a fixed network. The BBF (Broadband Forum, the standardization organization for the fixed access; see www.broadband-forum.org/) defines an architecture for fixed networks. There is an ongoing joint work item on FMC between these two organizations (3GPP TR 23.839, now moving into TS 23.139, and BBF WT 203). Many UEs address the FMC trend by providing multiple radio interfaces: one interface to connect to a 2G/3G/LTE access and a WiFi interface to connect to a fixed network.

There are a number of ongoing work items on FMC. In FMC, a dual-radio UE is generally assumed. The UE has one radio interface for the 3GPP access (e.g. LTE), and one radio interface for the fixed access (e.g. WiFi). In 3GPP, "Study on Support of BBF Access Interworking" (BBAI) covers interworking between 3GPP (the standardization organization for mobile networks) and BBF (the standardization organization for fixed networks) (3GPP TR 23.839, TS 23.139, BBF WT 203). Another work item in 3GPP, "Study on S2a Mobility based On GTP & WLAN access to EPC" (SaMOG) covers the standardization of a 3GPP network interworking with a WiFi radio access (3GPP TS 23.852). Additional standardization activities are ongoing in the WiFi Alliance. SaMOG is specific to S2a, but not specific to BBF.

In the WiFi Alliance, one of the focus areas is hotspots, such as public hotspots. Therefore, in addition to the residential networks described above, hotspots are increasingly becoming key to the success of FMC.

A 3GPP UE can attach to a non-3GPP access network (e.g. a fixed network) and connect to one or more Packet Data Networks (PDNs) via the S2 interface [3GPP TS 23.402]. The S2 interface comes in three types: S2a, S2b and S2c. The latter two overlay the non-3GPP access network and do not impact it. S2a is a more converged solution that does impact nodes in the non-3GPP access network. In S2a, the non-3GPP access network is seen as trusted; the non-3GPP access network is therefore denoted as TNAN (Trusted Non-3GPP Access Network). Where the TNAN uses Wireless LAN (WLAN) as the radio technology towards the UEs, the TNAN is denoted as TWAN (Trusted WLAN Access Network).

S2a over TWAN is now standardized in 3GPP (Chapter 16 of 3GPP TS 23.402). At present (3GPP Release 11), S2a over TWAN is restricted to support only a single PDN connection per UE. Also, the UE cannot indicate an Access Point Name (APN) and handover is not supported. This way, S2a over TWAN does not impose any requirements on the UE; in other words, an "unmodified UE" can be used, which increases time-to-market for the S2a solution.

FIG. 1 of the accompanying drawings is a schematic block diagram providing an architecture overview, illustrating a UE 2 connecting to a 3GPP domain 4 via a TWAN 6. The TWAN 6 comprises a Residential Gateway (RG) 8, an Access Node (AN) 10 and a gateway node denoted as a TWAN Access Gateway (TWAG) 12. The 3GPP domain 4 comprises one or more PDN Gateways (PGWs) 14.

In S2a, there is a General Packet Radio Service (GPRS) Tunnelling Protocol (GTP) or Proxy Mobile IP (PMIP) tunnel for each PDN connection between the TWAG 12 (e.g. a BBF Border Network Gateway (BNG)) in the TWAN 6 and the 3GPP PGW(s). Each PDN connection is anchored in a 3GPP PGW 14. The UE 2 receives one IP address (or prefix for IPv6) for each PDN connection, and it is the PGW 14 that assigns the address. Similarly, between the UE 2 and the TWAG 12 a point-to-point link is provided in order to separate the traffic from the different UEs and PDN connections.

A point-to-point link can be considered to be a protocol that provides a logical direct connection between two networking nodes. A data frame sent from node A via a point-to-point link to node B will not pass a node C. Note that a "point-to-point link" is a logical concept and can be implemented in several ways. The network between the UE 2 and the TWAG 12 would generally be Ethernet based, and examples of a point-to-point link between the UE 2 and TWAG 12 are: a L3 tunnel (e.g. Internet Protocol Security (IPsec) or IP-in-IP), and a L2 tunnel (e.g. L2TP).

The per-UE point-to-point link works satisfactorily in 3GPP Release 11 when there is a restriction on a single PDN connection per UE over TWAN. However, the present applicant has appreciated that an extension is needed to support multiple PDN connections per UE.

In particular, it has been appreciated that there could be a situation where a set of one or more PGWs assign the same IP address for different PDN connections. This could occur where, for example, there are two PDNs connections relating respectively to two closed corporate networks, each with their own addressing scheme. Each PDN might be served by a different PGW, and each PGW might be managed by a different operator. The 3GPP domain(s) and the UE 2 are designed to handle such an overlap without any issue. However, a problem is that the TWAG 12 will no longer be able to map upstream traffic to the correct GTP/PMIP tunnel.

It should be noted that the likelihood of such a problem occurring in a real deployment is small; most UEs 2 will only use a single PDN connection, and the IP addressing schemes of different PDNs will in most cases not overlap. However, the problem can and will occur without a solution, and the applicant has appreciated the desirability of addressing this issue.

There are typically two scenarios where such a problem of overlapping or clashing addresses when a UE access a 3GPP core network via a non-3GPP access network can arise. In both scenarios, a dual-radio UE is assumed; the UE 2 has one radio interface for a 3GPP access (e.g. LTE), and one radio interface for a non-3GPP access (e.g. WiFi).

A first scenario is illustrated schematically in FIG. 2 of the accompanying drawings. In the first scenario, the UE 2 is initially connected to a 3GPP access 16, and already has overlapping addresses in the 3GPP access 16, or has an address in the 3GPP access 16 which overlaps with an address already assigned in the non-3GPP access (TWAN) 6. As mentioned previously, overlapping addresses in the 3GPP access 16 presents no problem; 3GPP by design allows for such a situation. However, a problem occurs when the UE 2 performs a handover to the non-3GPP access 6.

In a second scenario, the UE 2 is attached to a non-3GPP access 6 and opens a new PDN connection. The new address for that PDN connection overlaps with an existing address in the second scenario.

In release 11, a per-UE point-to-point link between the UE 2 and the TWAG 12 is assumed. In most cases, the UE IP address in a packet's header will be sufficient to correlate that packet to an individual PDN connection. However, there are a few situations where this is not possible:

(a) Two or more PDN connections from one UE 2 might have the same IP address. This is in particular possible if these PDN connections are towards different IPv4 PDNs.

(b) Downlink (link layer) broadcasts do not include a specific UE 2 target IP address. An example of such packet is an IPv6 router advertisement.

(c) Uplink (link layer) broadcasts do not include a specific UE 2 source IP address. Such packets are for example used for service discovery.

(d) Downlink IP multicast does not include a specific UE 2 target IP address. Such packets may for example be sent from a server in a PDN.

In order to support multiple PDN connections per UE 2 over TWAN, it has been previously suggested maintaining a single point-to-point link per UE 2, and differentiate PDN connections based on UE IP address and/or UE MAC address. However, these solutions can be considered to impose functional restrictions and/or high impact to the UE 2.

It has also been previously proposed to remove completely the notion of multiple PDN connections in the UE 2, and leave it up to the network to route traffic to different PDNs. One example of such solution is disclosed in IETF Internet-Draft "Multiple APN Support for Trusted Wireless LAN Access", draft-gundavelli-netext-multiple-apn-pmipv6-01, available at datatracker.ietf.org/doc/draft-gundavelli-netext-multiple-apn-pmipv6. However, such a solution can be considered to break the current 3GPP architecture.

A need exists to provide multiple concurrent services over WLAN. For example when WLAN is used to provide access to cellular data networks, it is desirable to provide access to multiple PDNs (packet data networks). This capability is currently done on 3G/4G networks where e.g. IP Multimedia Subsystem (IMS) and Internet access can be simultaneously provided. Each of these services is identified via their APNs. Further the IP address spaces for each of those services may overlap, making IP address resolution of the services impossible.

Some approaches to provide multiple concurrent services over WLAN have been proposed, but there is currently no existing way of implementing them. Currently there are no means to manage PDN connections over "native" Wi-Fi Access. Layer-3 tunneling solutions such as IPsec can be used but this has certain disadvantages. For example, L3 tunneling solutions are typically transparent to the underlying WLAN access network and thus have limitations in the amount of Quality of Service (QoS) control that can be achieved. Furthermore, there is more overhead involved. In addition, L3 solutions are also not backwards compatible with S2a-over-TWAN solution specified in 3GPP rel-11.

For native WLAN access, Dynamic Host Configuration Protocol (DHCP) is typically used to request an IP address. However, DHCP is not a suitable protocol for managing PDN connections, primarily since there is no clear means to tear down an IP connection. Furthermore, terminal vendors are reluctant to modify DHCP implementations in the terminal in order to enhance them with additional functionality. DHCP is an old protocol and the implementations may not be easy to manage or may not even be fully under the terminal vendor's control.

Tunneling solutions below L3 solve these problems. Each tunnel carries a PDN connection. Several such solutions have been proposed, but these only describe the (user plane) traffic separation mechanism once the tunnel is setup. There is no known mechanism for setting up such tunnels.

SUMMARY

It is an object to provide a mechanism for setting up and controlling tunnels carrying a PDN connection below L3. According to a first aspect, there is provided a method of establishing and controlling a tunnel for carrying a PDN connection between a first endpoint and a second endpoint. The first endpoint sends a request to set up a tunnel, the request including a first identifier. It then receives a second identifier for use identifying the tunnel when receiving data sent from the second endpoint to the first endpoint. Data packets are sent from the first endpoint, the data packets including the first and/or second identifiers for identifying the tunnel from the first endpoint to the second endpoint. Data packets are received from the second endpoint, the data packets including the second identifier from the second endpoint to the first endpoint. An advantage of using identifiers is that tunnels carrying a PDN connection below L3 can be established and controlled.

As an option, the request comprises any of a MN ID identifying a requesting terminal; a request APN, a PDN connection lifetime, an IP preservation indicator, a PDN type, a PDN connection ID, a Handover indicator, and an EPS bearer identity. These options assist in controlling the tunnel.

As an option, the identifiers are subsequently included in a Generic Routing Encapsulation, GRE, header of data packets. As an alternative option, the identifiers comprise a Media Access Control, MAC, address in a MAC header. As a further alternative option, the identifiers comprise a Virtual Local Area Network, VLAN, identifier.

The method optionally further comprising sending an update message towards the second endpoint, the update message requesting an extension of the lifetime of the tunnel. It will be appreciated that the second endpoint can correspondingly send an update message to the first endpoint.

As an option, the method further comprises any of the first endpoint sending to the second endpoint a release message requesting that the tunnel is released, and the first endpoint receiving from the second endpoint a release message requesting that the tunnel is released.

The method optionally further comprises sending a push request message towards the second endpoint or receiving a push request message from the second endpoint.

The method allows for the establishment of plurality of tunnels, each tunnel of the plurality of tunnels being used for carrying a different PDN connection. When the second endpoint is a TWAG, a separate MAC address is associated with each PDN connection, making this a suitable second identifier for identifying the tunnel.

As an option, any of the first and second identifiers are allocated a value indicating that they relate to control plane data.

The endpoints optionally comprise a User Equipment and a Trusted WLAN Access Network Access Gateway.

The method optionally includes identifying the tunnel using the received second identifier.

As an option, the first identifier is for use identifying the tunnel when sending data from the first endpoint to the second endpoint.

According to a second aspect, there is provided a node for use in a communication network. The node is provided with a processor arranged to generate a request message for establishing a tunnel between the node and a second node, the request including a first identifier. A transmitter is provided that is arranged to send the request message to the second node. A receiver is provided, arranged to receive a second identifier for use identifying the tunnel when receiving data sent from the second node to the node. The processor is arranged to include any of the first and second identifiers in all subsequently sent data packets sent via the tunnel towards the second node. The use of tunnel identifiers allows the tunnel between the endpoints to be identified on both the uplink and the downlink.

As an option, the processor is arranged to include in the request message any of an MN ID identifying a requesting terminal, a request APN, a PDN connection lifetime, an IP preservation indicator, a PDN type, a PDN connection ID, a Handover indicator, and an EPS bearer identity.

The processor is optionally arranged to include identifiers in a GRE header of data packets. As an alternative option, the processor is arranged to use a MAC address in a MAC header as either of the first or second identifiers.

As an option, the processor is arranged to generate an update message to be sent using the transmitter to the second node, the update message requesting an extension of the lifetime of the tunnel. It will be appreciated that the node may receive an update message sent to the node, and the processor will act accordingly.

As a further option, the processor is arranged to generate a release message requesting that the tunnel is released, and the transmitter is arranged to send the release message.

The processor is optionally arranged to generate a push request message, and the transmitter is arranged to send the push request message to the second node.

The processor is optionally arranged to generate a plurality of messages to be sent to a plurality of further nodes in order to set up a plurality of tunnels, each tunnel of the plurality of tunnels being used for carrying a different PDN connection.

As an option, the processor is arranged to use identifiers with a value to indicate that the identifier relates to control plane data.

According to a third aspect, there is provided a computer program, comprising computer readable code which, when run on a computer apparatus, causes the computer apparatus to perform the method as described above in the first aspect.

According to a fourth aspect, there is provided a computer program product comprising a computer readable medium and a computer program as described above in the third aspect, wherein the computer program is stored on the computer readable medium.

There is also described herein a method of setting up and/or controlling a tunnel for carrying a PDN connection between a first endpoint and a second endpoint, the method comprising, at the first endpoint, sending a request to set up a tunnel, the request including a first identifier for use identifying the tunnel when sending data from the first endpoint to the second endpoint. The first endpoint receives a second identifier for use identifying the tunnel when receiving data sent from the second endpoint to the first endpoint. The first identifier is subsequently included in all data packets sent via the tunnel from the first endpoint to the second endpoint, and the second identifier is subsequently included in all data packets sent via the tunnel from the second endpoint to the first endpoint.

There is also described herein a node for use in a communication network, the node comprising a processor for generating a request message for setting up a tunnel between the node and a further node, the request including a first identifier for use identifying the tunnel when sending data from the node to the further node endpoint. A transmitter is provided for sending the request message to the further node, and a receiver is provided for receiving a second identifier for use identifying the tunnel when receiving data sent from the second node to the first node. The processor is arranged to include the first identifier in all subsequently sent data packets sent via the tunnel from the first endpoint to the second endpoint.

DETAILED DESCRIPTION

Figure 1:
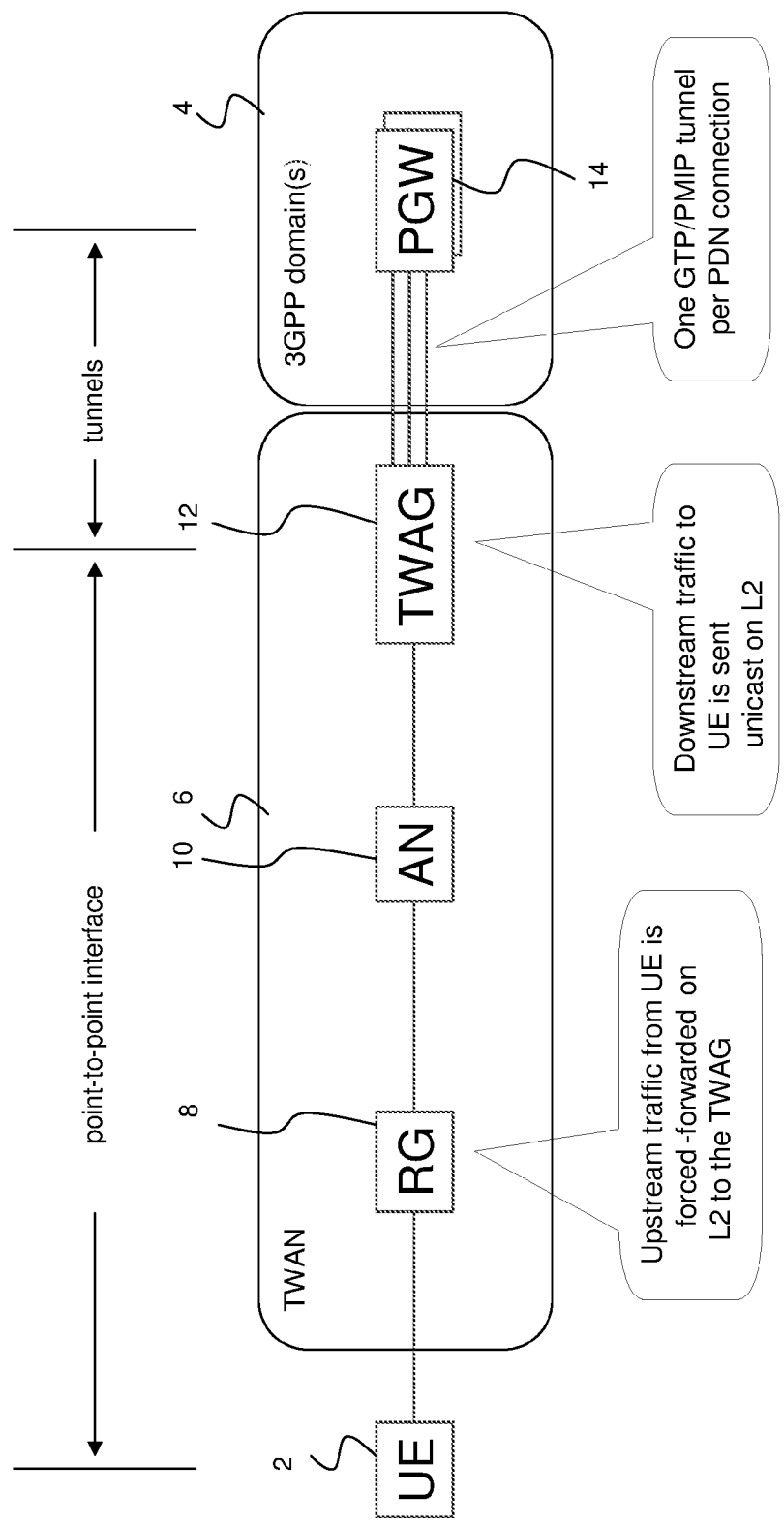
FIG. 1, discussed hereinbefore, is a schematic block diagram providing an architecture overview in which point-to-point links are provided between UE and TWAG, and tunnels between TWAG and PGW.
Figure 2:
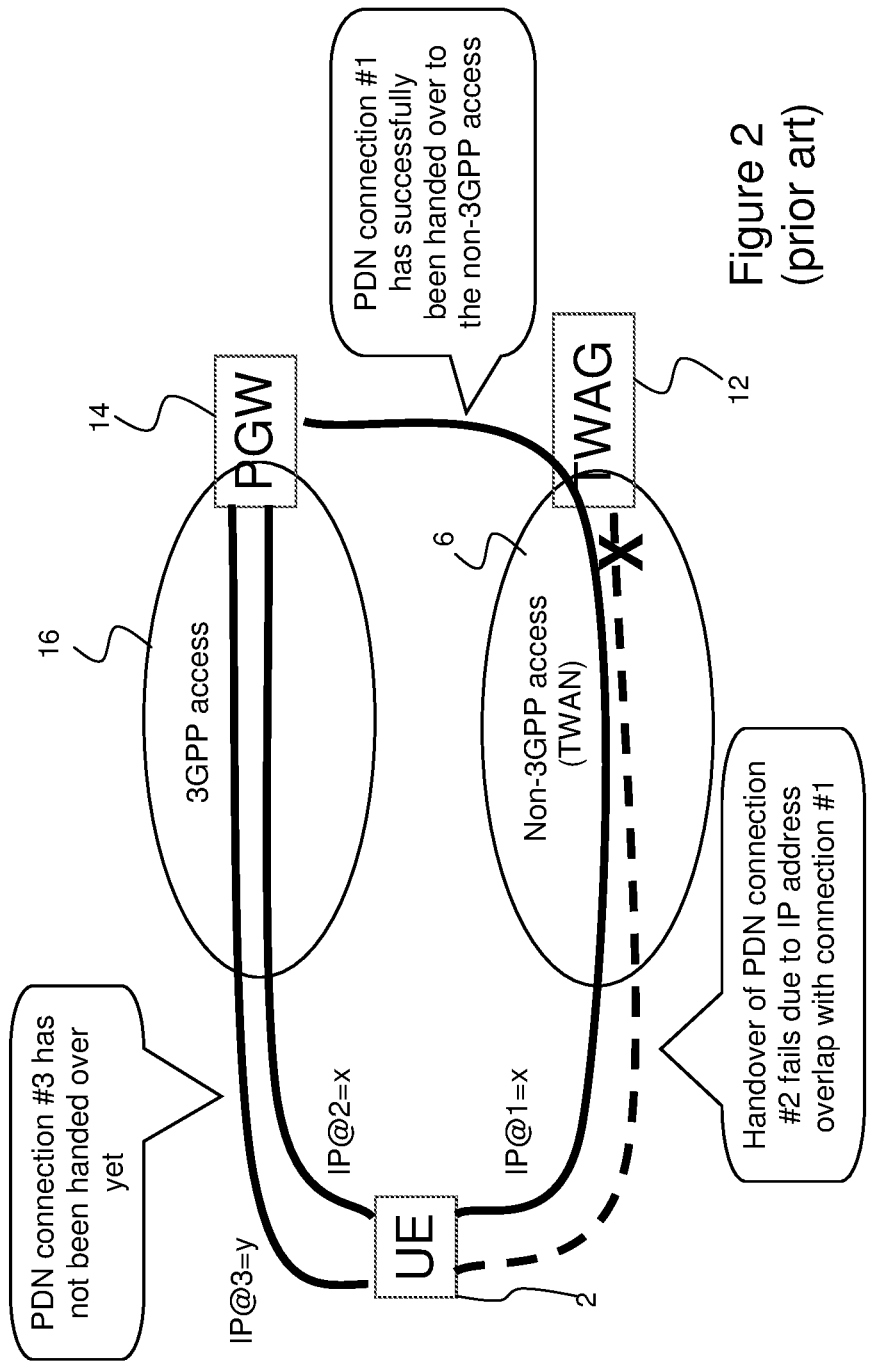
FIG. 2, also discussed hereinbefore, is a schematic illustration of a UE handing over three PDN connections from a 3GPP access to a non-3GPP access.

The description below is concerned primarily with a control protocol for Wireless LAN. It finds particular use in a below-L3 tunneling protocol that allows multiple tunnels to be set up between nodes acting as endpoints, each tunnel carrying a PDN connection. There are several techniques that can be used to set up such a tunnel. Before the control protocol is described, an exemplary technique for using such tunnels is described below. The description below refers to a non-IP below-L3 tunneling protocol.

In order to set up and control an exemplary below-L3 tunnel between two endpoints, a new protocol is described. The protocol is termed WLCP (Wireless LAN Control Protocol).

WLCP is a protocol between two endpoints. In a 3GPP deployment, one endpoint may be a UE and the other endpoint may be a Trusted Wireless LAN Access Gateway (TWAG) function.

The following description assumes the following primitives:

1. WLCP tunnel setup procedure. One endpoint indicates a request to setup a new tunnel.
2. WLCP tunnel update procedure. One endpoint indicates a keep-alive message to request an extended lifetime of the tunnel.
3. WLCP tunnel teardown procedure. One endpoint indicates a request to tear down an existing tunnel.
4. WLCP information push procedure. One endpoint sends one or more information elements to the other endpoint.

It will be appreciated that other primitives may be defined as and when they are required.

The WLCP provides below-L3 tunnel management support between two endpoints. One endpoint may learn if the other endpoint supports WLCP by mean of pre-configuration, or one endpoint may inform the other endpoint of its capability to support WLCP (e.g. a WLAN network may inform a UE by means of 802.11u or as part of an attachment procedure).

The following sub-sections define different WLCP procedures, all of which have the following in common.

One endpoint sends a request, and the other endpoint replies to that request.

All requests include a sequence number. The sequence number is increased for every subsequent request made to the same endpoint.

A reply includes the same sequence number as the corresponding request.

Each request and each reply may include zero or more options.

A reply may indicate ack or nack. In case of the latter, the reply contains a status code indicating the reason of the request rejection.

One of the main purposes of the WLCP is to provide a means to negotiate a tunnel key. Such a key is specific to a tunnel within the scope of the two endpoints. Using the key, one tunnel between two endpoints can be differentiated from another tunnel between the same endpoints. The key is part of the frame header. The key in the exemplary tunnel described above is a Generic Routing Encapsulation (GRE) key in the GRE header, but may be, for example, a media access control (MAC) address in the MAC header or a VLAN ID.

Both endpoints must be able to differentiate user plane data (i.e. a tunnel carrying a PDN connection) from control plane data (i.e. messages for WLCP procedures). One way to achieve this is to dedicate a specific key value to control plane signaling. For example, GRE key=0 could be reserved for control plane signalling, and all other GRE key values can be used for normal data plane traffic.

Figure 3:
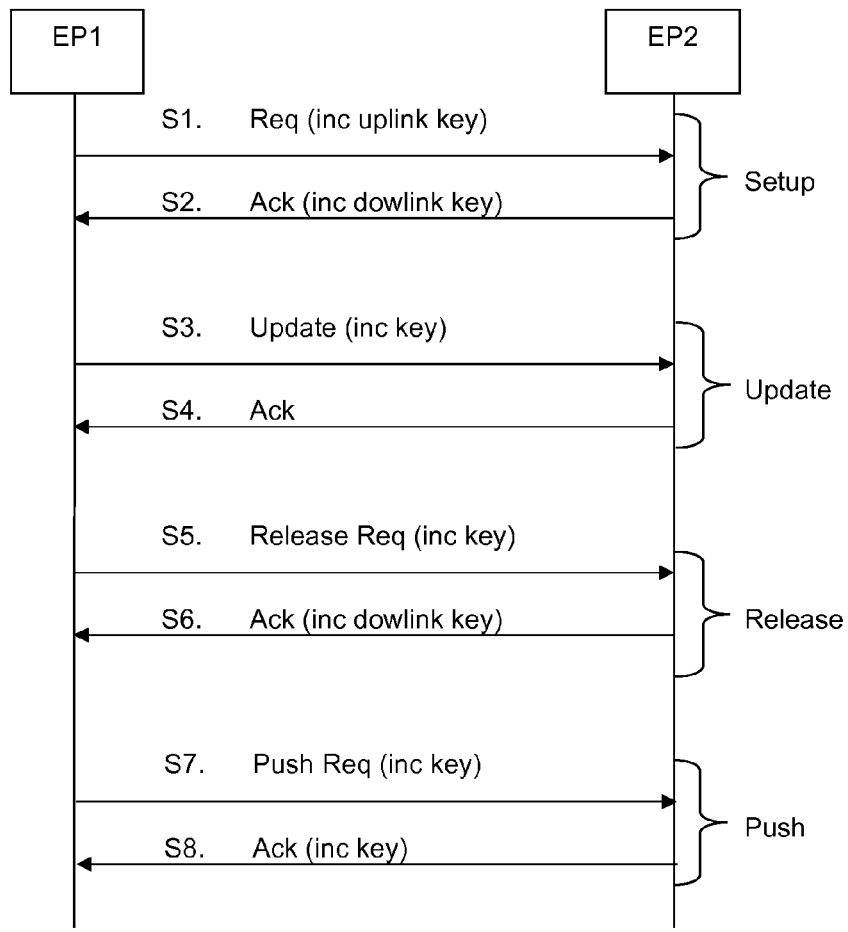
FIG. 3 is a signalling diagram illustrating exemplary signalling according to different aspects of a control protocol.

An exemplary WLCP tunnel setup procedure is as follows, with reference to FIG. 3, in which the first endpoint is denoted EP1 and the second endpoint is denoted EP2.

EP1 sends S1 a WLCP tunnel setup request to EP2. The request must include an option with a proposed uplink tunnel key. Uplink is here defined as "sent from the requester" (EP1 is the requester in this example). That key is later to be used in the uplink header (e.g. the GRE header) for all packets for this particular tunnel. The key must be unique within the scope of the requesting endpoint. The request may include an option that determines a requested lifetime of the tunnel.

Other options may be 3GPP-specific. For example, one use case for a WLCP tunnel is to carry a PDN connection. In such case, the UE acting as WLCP requesting endpoint EP1 may include MN ID, the request APN, PDN connection lifetime, IP preservation indicator, PDN type, PDN connection ID, HO indicator, EPS bearer ID, etc. It is not specified here what the other endpoint, i.e. the TWAG, does with these kind of 3GPP-specific options.

If the WLCP tunnel setup reply indicates ack S2, then that reply must include an option with a downlink tunnel key. Downlink is here defined as "sent from the replier" (EP2 is the replier in this example). The key is later to be used in the downlink header (e.g. the GRE header) for all packets for this particular tunnel. The key must be unique within the scope of the replying endpoint EP2.

The procedure in this section is an example of one tunnel set up. However, note that the same procedure may be used to set up multiple tunnels.

During the tunnel setup procedure, a lifetime may be negotiated between the two endpoints. Any time before the lifetime expires, one endpoint EP1 must send S3 a WLCP update tunnel maintenance request in order to increase the remaining tunnel lifetime. Such a request must include an option carrying the tunnel key to identify a particular tunnel and an option containing the new lifetime. In accordance with the WLCP, the second endpoint EP2 acknowledges S4 the request.

A tunnel for which the lifetime has expired may be released by each of the two endpoints EP1, EP2.

The procedure in this section is an example of one tunnel update. It is possible to update multiple tunnels using the same procedure.

An exemplary WLCP tunnel release procedure is as follows:

At any time, one endpoint EP1 may release a tunnel by sending S5 a WLCP tunnel release request. Such a request must include an option carrying the tunnel key to identify a particular tunnel. In accordance with the WLCP, the second endpoint EP2 acknowledges S6 the request.

The procedure in this section is an example of one tunnel release. It is possible to release multiple tunnels using the same procedure.

An exemplary WLCP information push procedure is as follows:

At any time, one endpoint EP1 may send S7 a WLCP information push request to the other endpoint. An information push could, for example, be used to push QoS parameters from a TWAG 12 to a UE 2. Information elements are coded options.

The request includes an option carrying the tunnel key to identify a particular tunnel. In accordance with the WLCP, the second endpoint EP2 acknowledges S8 the request.

The above-described procedure is an example of pushing information related to one tunnel. It is also possible to push (different) information to multiple tunnels, or to push information not specific to any particular tunnel. In the latter case, the tunnel key is omitted.

The followings are exemplary fields to be used with WLCP:
1. Procedure name
2. Sequence Number
3. Reply result (ack or nack)
4. Reply status code (upon nack)

The followings are exemplary WLCP options:
1. UL tunnel key: the tunnel key used for uplink traffic
2. DL tunnel key: the tunnel key used for downlink traffic
3. Lifetime: the lifetime of the tunnel
4. 3GPP-specific options (not further specified here)

Figure 4:
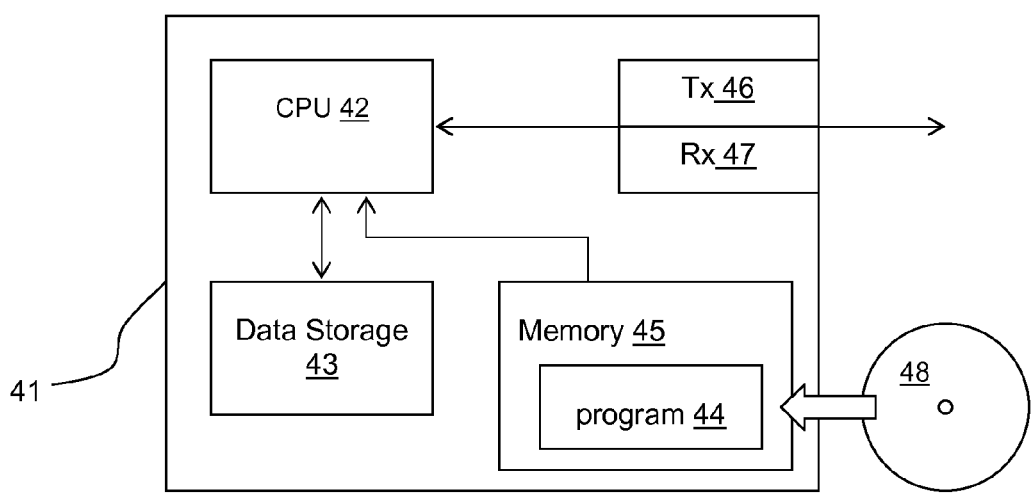
FIG. 4 is a network node according to an embodiment of the invention.

Referring to FIG. 4 there is illustrated an endpoint node 41 in which the techniques described herein can be implemented. A Central Processing Unit (CPU) 42 is provided to retrieve data from a data storage 43. A program 44 is stored in a non-transitory computer readable medium in the form of a memory 45. When the program 44 is executed by the CPU 43, the CPU 43 is able to generate signalling using the protocols described above and send the generated signals using in In/Out (I/O) interface (in this example, shown as a transmitter 46 and a receiver 47). Note that the program 44 may be provided on an external memory such as a CD or a flash drive 48, and either loaded directly to the CPU 42 for execution or transferred onto the memory 45.

The CPU 42 may be used to generate a request message for setting up a tunnel, the request message including information such as an MN ID identifying a requesting terminal, a request APN, a PDN connection lifetime, an IP preservation indicator, a PDN type, a PDN connection ID, a Handover indicator, and an EPS bearer.

The CPU 42 may be arranged to include identifiers in a GRE header of data packets. Alternatively, the CPU 42 may be arranged to use a MAC address in a MAC header as either of the first or second identifiers.

The CPU 42 may be used to generate an update message to be sent using the transmitter to the second node, the update message requesting an extension of the lifetime of the tunnel. The CPU 42 may alternatively or additionally be used to generate a release message requesting that the tunnel is released, and the transmitter is arranged to send the release message. The CPU 42 the processor may alternatively or additionally be arranged to generate a push request message, and the transmitter is arranged to send the push request message to the second node.

The CPU 42 may be arranged to generate a plurality of messages to be sent to a plurality of further nodes in order to set up a plurality of tunnels, each tunnel of the plurality of tunnels being used for carrying a different PDN connection. This is particularly useful when the TWAG MAC address is used to identify the tunnel on both the downlink and the uplink, as each TWAG MAC address is associated with a different tunnel.

The CPU 42 may be arranged to use identifiers with a value to indicate that the identifier relates to control plane data.

Figure 5:
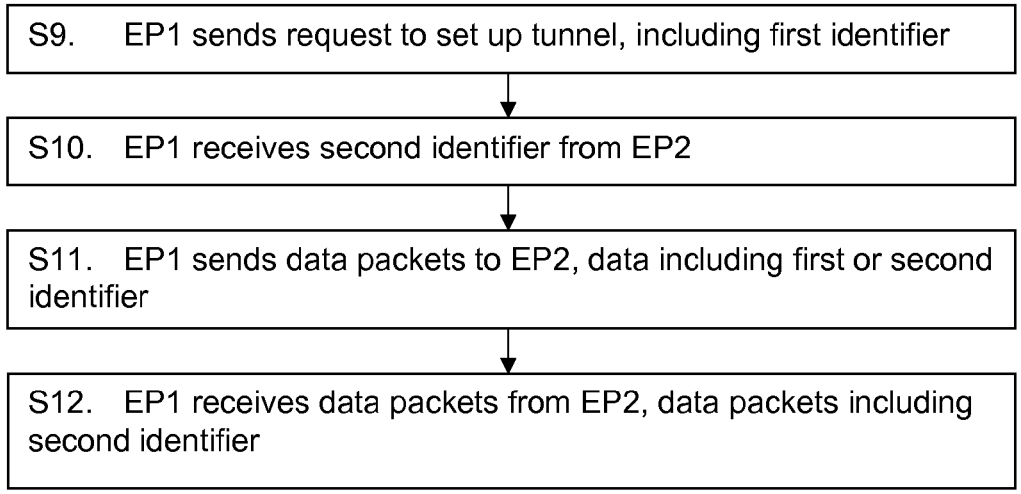
FIG. 5 is a flow diagram showing exemplary steps.

FIG. 5 herein shows the steps of an exemplary embodiment. The following numbering corresponds to that of FIG. 5:

S9. EP1 sends a request to set up a tunnel to EP2. The request includes a first identifier allowing EP2 to identify EP1.

S10. EP1 receives a second identifier from EP2.

S11. When EP1 sends data packets to EP2, it includes the first and/or second identifier in the data packets, allowing EP2 to identify the tunnel.

S12. When EP2 sends data packets to EP1, it includes the second identifier in the data packets, allowing EP1 to identify the tunnel.

Figure 6:
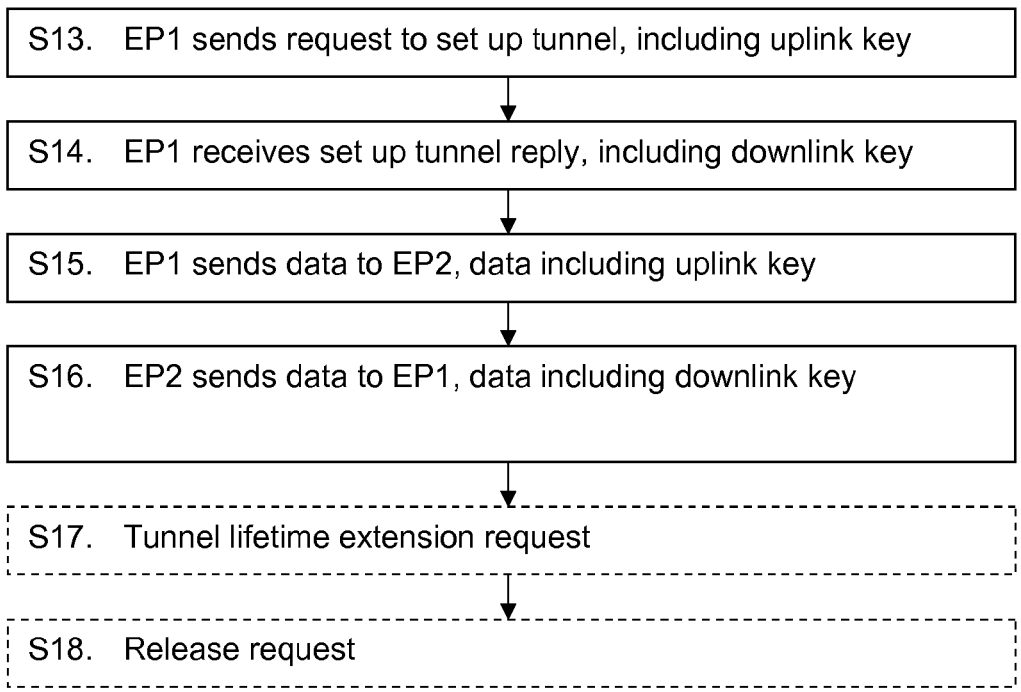
FIG. 6 is a flow diagram showing steps according to a further exemplary embodiment.

Referring to FIG. 6 herein, steps of exemplary embodiments are illustrated. The following numbering corresponds to that of FIG. 6:

S13. The first endpoint EP1 sends a request to set up a tunnel. The request includes a first identifier (or uplink key) for use identifying the tunnel when sending data from the first endpoint EP1 to the second endpoint EP2. The request may also include a lifetime of the tunnel.

S14. EP1 receives a second identifier (or downlink key) for use identifying the tunnel when receiving data sent from EP2.

S15. EP1 sends data packets via the tunnel to EP2, the data packets including the first identifier (uplink key).

S16. EP2 sends data packets via the tunnel to EP1, the data packets including the second identifier (downlink key).

S17. If necessary, an update message is sent between EP1 and EP2 requesting an extension to the lifetime of the tunnel. This may be sent from EP1 to EP2, or from EP2 to EP1.

S18. If necessary, a release request is sent from EP1 to EP2 or from EP2 to EP1, the release request requesting that the tunnel is released.

Figure 7:
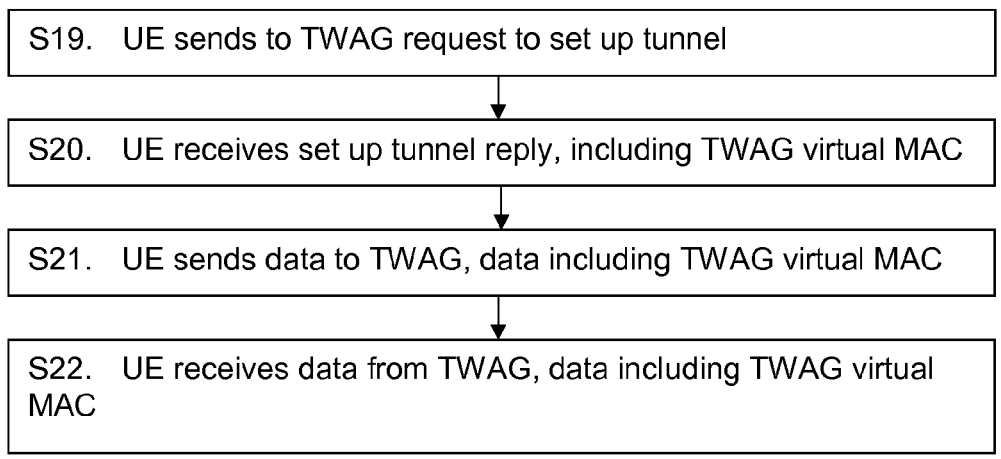
FIG. 7 is a flow diagram showing steps according an exemplary embodiment when setting up a tunnel between a UE and a TWAG.

In an exemplary embodiment, illustrated in FIG. 7, the second identifier relating to the TWAG is used to identify the tunnel on both the uplink and the downlink. The following numbering corresponds to that of FIG. 7:

S19. The UE 2 sends a request to set up a tunnel to the TWAG 12. An identifier is used to allow the TVVAG 12 to identify the UE. An example is where the message is sent in an Ethernet frame, which uses the UE MAC address as the source address. Additional identifiers, such as sequence numbers, may be used.

S20. The TWAG 12 sends a reply to the UE 2, the reply including the TWAG virtual MAC address. The TWAG virtual MAC address is used as a tunnel identifier. Note that the virtual MAC address is simply a MAC address that is assigned for a specific PDN connection. It may be 'virtual' or it may be physical if the TWAG provisioned with sufficient physical MAC addresses. The term 'virtual' is used herein to denote a TWAG MAC address assigned to a specific PDN connection.

S21. The UE 2 sends data to the TWAG 12 via the tunnel, using the TWAG virtual MAC address as the tunnel identifier.

S22. The UE 2 receives data from the TWAG 12 via the tunnel, using the TWAG virtual MAC address as the tunnel identifier.

As an example, the tunnel identifiers are a virtual MAC address assigned by the TWAG 12. In this example, each PDN connection is associated with a virtual MAC address associated with the TWAG 12. Uplink data packets for a particular PDN connection include a UE 2 MAC address as a source address and a TWAG 12 virtual MAC address for that PDN connection as a destination address. Downlink data packets for the particular PDN connection include the TWAG 12 virtual MAC address for that PDN connection as a source address and the UE MAC address as the destination address. In the example of FIG. 5, the UE 2 MAC address is the first identifier and the TWAG 12 virtual MAC address is the second identifier. Once the UE 2 is aware of the TWAG virtual MAC address, it uses this as the identifier in subsequent packets sent to the TWAG 12, allowing the TWAG 12 to identify which packet belongs to which PDN connection.

In the case where multiple tunnels are established between the UE 2 and the TWAG 12, a different virtual TWAG MAC address is used for each tunnel. The virtual MAC address is used for subsequent data plane signaling, so in an uplink data plane message, the Ethernet frame header has the UE's MAC address as the source address and the TWAG's virtual MAC as the destination address. For a downlink data plane message, the Ethernet frame header has a TWAG physical MAC address as the source address and the TWAG virtual MAC address contained in the Ethernet frame, allowing the tunnel to be identified by the TWAG virtual MAC address on both the uplink and the downlink.

The above described techniques provide a lightweight control protocol (WLCP) that can be used in combination with other concepts for using tunnels to carry a plurality of PDN connections. The proposed protocol has benefits compared to L3 tunnel management protocols (e.g. IKEv2/IPSec) and existing IP management protocol such as DHCP, such as the ability to tear down tunnels, reduced signalling overhead, and no requirement to modify existing protocols.

It will be appreciated by the person of skill in the art that various modifications may be made to the above-described embodiments without departing from the scope of the present invention as defined in the claims.

The following abbreviations have been used in this description:
3GPP 3rd Generation Partnership Project
AN Access Node
AP Access Point
APN Access Point Name
BBAI BBF Access Interworking
BBF Broadband Forum
BNG Border Network Gateway
CAPEX Capital Expenditure
DHCP Dynamic Host Configuration Protocol
EPC Evolved Packet Core
EPS Evolved Packet System
FMC Fixed-Mobile Convergence
GPRS General Packet Radio Service
GRE Generic Routing Encapsulation
GTP GPRS Tunneling Protocol
IANA Internet Assigned Numbers Authority
IE Information Element
IMS IP Multimedia Subsystem
IP Internet Protocol
IPsec Internet Protocol Security
LTE Long Term Evolution
MAC Media Access Control
MMTeI Multimedia Telephony
MN ID Mobile Node identity
NA(P)T Network Address (and Port) Translator
OPEX Operational expenditure
PDN Packet Data Network
PGW PDN GateWay
PMIP Proxy Mobile IP
QoS Quality of Service
RG Residential Gateway
SAE System Architecture Evolution
SDO Standardization Organization
TNAN Trusted Non-3GPP Access Network
TWAG TWAN Access Gateway
TWAN Trusted WLAN Access Network
UE User Equipment
VLAN Virtual Local Area Network
WLAN Wireless Local Area Network
WLAN AP Wireless LAN Access Point
WLCP Wireless LAN Control Protocol

The invention claimed is:

1. A method, the method comprising:
a first node sending to a second node a request to set up a tunnel for a specific Packet Data Network (PDN) connection, the request including a first identifier, wherein the second node supports a plurality of Media Access Control (MAC) addresses for multiplexing multiple PDN connections;
receiving, at the first node, a response from the second node to the tunnel setup request, the response comprising a second identifier for use in identifying the tunnel, said second identifier for use in identifying the tunnel being a selected one of said plurality of MAC addresses supported by the second node; and
after receiving the response, receiving, at the first node, a data packet transmitted by the second node, the data packet comprising i) a MAC header comprising the first identifier and the second identifier for use in identifying the tunnel and ii) user plane data.

2. The method according to claim 1, wherein, the request comprises one or more of: a Mobile Node ID identifying a requesting terminal; a request Access Point Name, a PDN connection lifetime, an IP preservation indicator, a PDN type, a PDN connection ID, a Handover indicator, and an Evolved Packet System bearer identity.

3. The method according to claim 1, further comprising:
the first node sending to the second node a second request to set up a second tunnel, the second request including the first identifier;
receiving, at the first node, a second response from the second node to the second tunnel setup request, the second response comprising a third identifier for use in identifying the second tunnel, said third identifier being a selected one of said plurality of MAC addresses supported by the second node, wherein
the third identifier is different than the second identifier.

4. The method according to claim 1, wherein the first identifier is a MAC address allocated to the first node.

5. The method according to claim 1, the method further comprising sending an update message towards the second node, the update message requesting an extension of the lifetime of the tunnel.

6. The method according to claim 1, further comprising one of:
a) the first node sending to the second node a release message requesting a release of the tunnel, and
b) the first node receiving from the second node a release message requesting a release of the tunnel.

7. The method according to claim 1, further comprising one of:
a) sending a push request message towards the second node, and
b) receiving a push request message from the second node.

8. The method according to claim 1, further comprising establishing a plurality of tunnels, each tunnel of the plurality of tunnels being used for carrying a different PDN connection.

9. The method according to claim 1, wherein the first identifier is allocated a value indicating that it relates to control plane data.

10. The method according to claim 1, wherein the first node is a User Equipment and the second node is a Trusted WLAN Access Network Access Gateway.

11. The method according to claim 1, further comprising identifying the tunnel using the received second identifier.

12. The method according to claim 3, wherein the first identifier and the second identifier are used to identify the tunnel.

13. A first node for use in a communication network, comprising:
- a processor arranged to generate a request message for establishing a tunnel between the first node and a second node for a PDN connection, the request including a first identifier, wherein the second node supports a plurality of Media Access Control (MAC) addresses for multiplexing multiple PDN connections;
- a transmitter for sending the request message to the second node; and
- a receiver for receiving a response to the request transmitted by the second node, the response comprising a second identifier for use in identifying the tunnel, wherein
- said second identifier for use in identifying the tunnel is a selected one of said plurality of MAC addresses supported by the second node, and
- the processor is arranged to include the second identifier in all subsequently sent data packets sent via the tunnel towards the second node.

14. The first node according to claim 13, wherein the processor is arranged to include in the request message one or more of: an MN ID identifying a requesting terminal, a request APN, a PDN connection lifetime, an IP preservation indicator, a PDN type, a PDN connection ID, a Handover indicator, and an EPS bearer.

15. The first node according to claim 13, wherein
- the processor is further arranged to generate a second request message for establishing a second tunnel between the first node and the second node for a second PDN connection, the second request including the first identifier;
- the processor is configured to employ the transmitter to send the second request message to the second node; and
- the receiver is operable for receiving a second response to the second request transmitted by the second node, the second response comprising a third identifier for use in identifying the second tunnel, wherein
- said third identifier is a selected one of said plurality of MAC addresses supported by the second node,
- said third identifier is different than the second identifier, and
- the processor is arranged to include the third identifier in all subsequently sent data packets sent via the second tunnel towards the second node.

16. The first node according to claim 13, wherein the first identifier is MAC allocated to the first node.

17. The first node according to claim 13, wherein the processor is arranged to generate an update message to be sent using the transmitter to the second node, the update message requesting an extension of the lifetime of the tunnel.

18. The first node according to claim 13, wherein the processor is arranged to generate a release message requesting that the tunnel is released, and the transmitter is arranged to send the release message.

19. The first node according to claim 13, wherein the processor is arranged to generate a push request message, and the transmitter is arranged to send the push request message to the second node.

20. The first node according to claim 16, wherein the first identifier and the second identifier are used to identify the tunnel.

21. The first node according to claim 13, wherein the first identifier is allocated a value indicating that it relates to control plane data.

22. A computer program product comprising a non-transitory computer readable medium storing a computer program comprising computer readable code which, when run on a computer apparatus, causes the computer apparatus to perform the method according to claim 1.

23. A method of establishing a tunnel between a user equipment (UE) and an access gateway (AG), the method comprising:
- the UE sending to the AG a request for setting up a tunnel between the UE and the AG for a specific PDN connection, wherein the AG supports a plurality of MAC addresses for multiplexing multiple PDN connections;
- the UE receiving from the AG a response to the request, the response comprising a first connection identifier (CID) assigned to the specific PDN connection, wherein the first CID included in the received response and assigned to the specific PDN connection is an AG MAC address, said AG MAC address being one of the plurality of MAC addresses supported by the AG for multiplexing multiple PDN connections;
- the UE maintaining a mapping between the specific PDN connection and said AG MAC addresses assigned to the specific PDN connection;
- after receiving the AG MAC address in the response, the UE sending to the AG first user plane data for the specific PDN connection, wherein the step of sending the first user plane data for the specific PDN connection to the AG comprises the steps of: (1) the UE generating a first link layer frame comprising the first user plane data and a first link layer frame header comprising the received AG MAC address in a destination address field of the first link layer frame header and (2) transmitting the generated first link layer frame to the AG; and
- after receiving the AG MAC address in the response, the UE receiving from the AG a second link layer frame comprising second user plane data and a second link layer frame header comprising the AG MAC address in a source address field of the second link layer frame header.

24. The method of claim 23, wherein
the first link layer frame is a first Ethernet frame, and
the second link layer frame is a second Ethernet frame.

25. The method of claim 23, wherein
the first link layer frame is generated and transmitted by the UE after the UE receives the second link layer frame.

26. The method of claim 23, further comprising:

the UE sending to the AG a second request for setting up a second tunnel between the UE and the AG for a second specific PDN connection;

the UE receiving from the AG a second response to the second request, the second response comprising a second CID assigned to the second specific PDN connection, wherein the second CID included in the received second response and assigned to the second specific PDN connection is a second AG MAC address, said second AG MAC address being one of the plurality of MAC addresses supported by the AG for multiplexing multiple PDN connections;

the UE maintaining a mapping between the second specific PDN connection and said second AG MAC addresses assigned to the second specific PDN connection;

after receiving the second AG MAC address in the second response, the UE sending to the AG third user plane data for the second specific PDN connection, wherein the step of sending the third user plane data for the second specific PDN connection to the AG comprises: the UE generating a third link layer frame comprising the third user plane data and comprising a third link layer frame header comprising the received second AG MAC address in a destination address field of the third link layer frame header and transmitting the generated third link layer frame to the AG; and after receiving the second AG MAC address in the second response, the UE receiving from the AG a fourth link layer frame comprising fourth user plane data and a fourth link layer frame header comprising the second AG MAC address in a source address field of the fourth link layer frame header.

* * * * *